(12) United States Patent
Dwin

(10) Patent No.: US 8,781,941 B2
(45) Date of Patent: Jul. 15, 2014

(54) METHOD AND APPARATUS FOR CONDUCTING LOAN REPURCHASE TRANSACTIONS

(75) Inventor: Damien Dwin, New York, NY (US)

(73) Assignee: Goldman, Sachs & Co., New York, NY (US)

(*) Notice: Subject to any disclaimer, the term of this patent is extended or adjusted under 35 U.S.C. 154(b) by 1761 days.

(21) Appl. No.: 10/309,741

(22) Filed: Dec. 4, 2002

(65) Prior Publication Data

US 2004/0030638 A1  Feb. 12, 2004

Related U.S. Application Data

(60) Provisional application No. 60/402,106, filed on Aug. 8, 2002, provisional application No. 60/410,453, filed on Sep. 13, 2002.

(51) Int. Cl.
*G06Q 40/00* (2012.01)
*G06Q 40/04* (2012.01)

(52) U.S. Cl.
CPC .................................. *G06Q 40/04* (2013.01)
USPC ........................................................ 705/37

(58) Field of Classification Search
CPC ...................................................... G06Q 40/04
USPC ...................................................... 705/35–40
See application file for complete search history.

(56) References Cited

U.S. PATENT DOCUMENTS

2001/0037284 A1* 11/2001 Finkelstein et al. ............ 705/37

OTHER PUBLICATIONS

Financial Accounting Standards Board "Statement of Financial Accounting Standards No. 140" Sep. 2000.*
Walker, Sloan "Securities Lending Provides Both Profit and Risk for CBO Transactions", Structured Finance [Special Report], Moody's Investors Service, Feb. 18, 2000, pp. 1-8.
Alex Reyfman and Thomas Marx, "CDO Securities Lending: A Welcome Boost to CDO Economics", Credit Derivatives Strategies, Goldman Sachs, May 21, 2002, 11pgs.

* cited by examiner

*Primary Examiner* — Thomas M Hammond, III
(74) *Attorney, Agent, or Firm* — Perkins Coie LLP

(57) ABSTRACT

Systems, methods, apparatus, computer program code and means for conducting repurchase transactions include identifying at least a first bank loan held by a first party. The at least first bank loan is transferred to a second party in exchange for a first sum, and the parties agree, at substantially the same time as the parties agree to the transfer, that the first party repurchases the first bank loan at a later date for a second sum. In some embodiments, reverse repurchases may also be performed.

9 Claims, 9 Drawing Sheets

METHOD AND APPARATUS FOR CONDUCTING LOAN REPURCHASE TRANSACTIONS

CROSS REFERENCE TO RELATED APPLICATIONS

This application claims priority to, and hereby incorporates by reference for all purposes, U.S. Provisional Application Ser. Nos. 60/402,106, and 60/410,453, filed Aug. 8, 2002 and Sep. 13, 2002 respectively.

FIELD OF THE INVENTION

The present invention relates to methods and apparatus for conducting transactions. More particularly, embodiments of the present invention relate to methods and apparatus for conducting loan repurchase agreement transactions.

BACKGROUND OF THE INVENTION

Repurchase agreements are widely-used in some fixed income investment sectors. For example, repurchase agreements are common in the U.S. Treasury and mortgage-backed securities (MBS) markets. A repurchase agreement is a contract between parties to transfer an interest in securities (a "sale") along with a simultaneous agreement to repurchase the interest in the same (or similar) securities at a future date. The consideration paid for such an agreement typically reflects short term money market rates. The price difference between the sale and the repurchase is referred to as the "repurchase amount". In a typical two-party repurchase transaction, the securities which are involved in the repurchase are typically fixed income securities such as U.S. government securities (such as U.S. Treasury bills) or other bonds. Details of repurchase agreements which involve the repurchase of these types of securities are provided in "Securities Lending and Repurchase Agreements", 1997, Fabozzi Ed., Frank J. Fabozzi Associates, the contents of which are incorporated herein by reference for all purposes.

These repurchase agreements provide an efficient form of financing for investors interested in improving returns on capital and returns on equity. Unfortunately, repurchase agreements have generally been limited to use with certain types of securities which are liquid and have a relatively low risk. U.S. Treasury bills are a preferred form of collateral in these transactions. Further, U.S. bankruptcy laws provide additional protection to parties to repurchase transactions which involve securities.

Bank loans are a type of investment which has been increasing in popularity. The secondary market for floating-rate corporate bank loans has steadily grown over the past decade. For example, Standard & Poor's Portfolio Management Data (PMD) products track the new issue volume for leveraged loans. New issue volumes reached over $250 billion in 1998. The Loan Pricing Corporation (a Reuters company) estimated in 2001 that the total active syndicated volume (including both investment and non-investment grade loans) is around $2.8 trillion.

Investments in bank loans can have return profiles that are very skewed to the downside with not much upside beyond the base case. For example, for a single B-rated loan at par that pays Libor+3.00%, the best case scenario is that there is no default or credit deterioration. In the best case, the total return will be Libor+3.00%. There are, unfortunately, a number of potentially-worse scenarios. For example, a spread may widen in which the mark-to-market pricing of the loan is depressed and the loan holder may be forced to sell. Or, the loan may enter into default in which case there may be a partial (or even a full) loss of capital. In general, bank loans have a capped upside because they are usually callable or prepayable.

It would be desirable to provide transactions which allow bank loans to be readily transferred to increase their liquidity. It would further be desirable to provide techniques which allow bank loan investors to reduce the risk associated with their investments in bank loans. It would further be desirable to address deficiencies in prior art bank loan transactions.

SUMMARY OF THE INVENTION

To alleviate the problems inherent in the prior art, embodiments of the present invention provide systems, methods, apparatus, computer program code and means for conducting repurchase transactions in which at least a first bank loan held by a first party is identified. The at least first bank loan is transferred to a second party in exchange for a first sum, and the parties agree, at substantially the same time as the parties agree to the transfer, that the first party repurchases the first bank loan at a later date for a second sum. In some embodiments, reverse repurchases may also be performed.

Some embodiments provide a system, method, apparatus, computer program code and means for hedging risk associated with an investment which includes identifying a first bank loan having a desired risk profile; borrowing, from a lender, the first bank loan for a period in exchange for collateral and a fee; and selling the first bank loan to a buyer for a payment amount.

Some embodiments provide a system, method, apparatus, computer program code, and means for conducting a transaction including entering into a plurality of reverse bank loan repurchase agreements to build an inventory of available bank loans. At least one of the available bank loans is lent to a short seller, for a term, in exchange for collateral and a fee. Prior to expiration of the term, at least one of the available bank loans is returned to the lender, and the collateral is returned to the short seller.

Some embodiments provide a system, method, apparatus, computer program code, and means for conducting a transaction including identifying a first investment to be hedged, estimating a performance of the first investment, identifying a group of bank loans available for shorting, identifying a desired performance of a hedged portfolio consisting of the first investment and a short position in at least one of the bank loans in the group of bank loans, and constructing a hedged portfolio providing the desired performance.

Some embodiments provide a system, method, apparatus, computer program code, and means for conducting a transaction including identifying an investment position to be hedged, identifying at least a first bank loan having a desired attribute, lending the at least first bank loan to a short seller in exchange for collateral, and investing the collateral to hedge the investment position.

With these and other advantages and features of the invention that will become hereinafter apparent, the nature of the invention may be more clearly understood by reference to the following detailed description of the invention, the appended claims and to the several drawings attached herein.

DETAILED DESCRIPTION OF THE INVENTION

Figure 1:
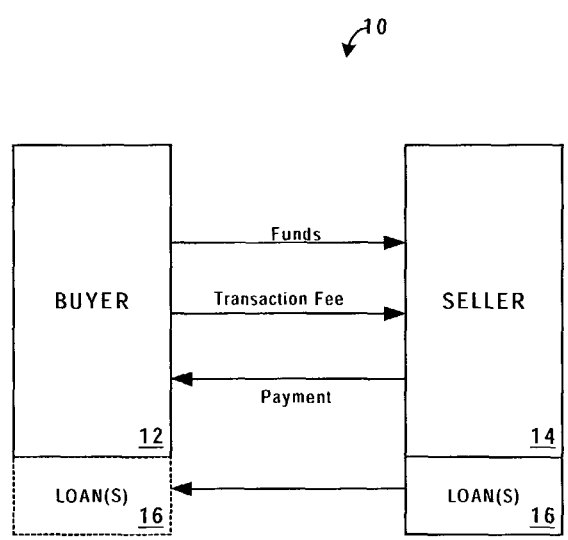
FIG. 1 is a block diagram of a bank loan repurchase transaction consistent with embodiments of the present invention.

Applicant has recognized that there is a need for a system, method, apparatus, computer program code, and means for conducting loan repurchase transactions and for shorting bank loans.

According to some embodiments, systems and methods are provided for conducting repurchase transactions using bank loans. As described above, repurchase agreements have previously been utilized in transactions associated with the borrowing of securities, such as U.S. Treasury bills or the like. Applicant has developed techniques allowing parties to enter into repurchase agreements involving bank loans. Applicant has also developed techniques allowing the hedging or management of risk using bank loans.

For clarity, a number of terms are used herein to describe features of some embodiments of the present invention. For example, as used herein, the term "bank loan" is used to refer to loans which are issued by a lender to an obligor and which are broadly syndicated loans having coupons of, for example, greater than Libor plus 1.00 to 1.50%. Typically, the lender is a financial institution such as a bank, and the loan is associated with corporate debt obligations. Bank loans include different types, such as fully-funded term loans or revolving lines of credit. Bank loans are not "securities".

Attributes of a particular bank loan are typically specified by one or more parameters, including, for example: the maturity of the loan, a funded amount (which may vary as a company draws against a line of credit), a spread over Libor on funded amount, a callable protection period, and an amortization schedule. Pursuant to some embodiments, bank loan repurchase transactions may involve individual bank loans or pools of bank loans. For ease of reference, unless otherwise noted herein, both a single bank loan and a pool or portfolio of bank loans may be referred to in the singular (e.g., as a "bank loan").

As used herein, the term "bank loan repurchase agreement" or "bank loan repo agreement" is used to refer to an agreement between two parties involving the immediate sale of a bank loan and a simultaneous agreement to repurchase the bank loan at a future date. As used herein, the term "reverse bank loan repurchase agreement" or "reverse bank loan repo agreement" is used to refer to the reverse transaction (e.g., where the parties agree to an immediate purchase of a bank loan and a simultaneous agreement to resell the bank loan at a future date).

As used herein, the term "hedge" is used to refer to techniques which reduce loss risks associated with a particular investment. One technique used to hedge against loss risks in securities transactions is "shorting" or "short selling" of securities to offset projected losses in a securities investment. As will be described further below, Applicant has developed techniques to allow shorting of bank loans. As used herein, the term "shorting", "short selling" or "a short sale" may used to refer to a transaction where an investor borrows a bank loan from a party such as a broker and sells it, with the understanding that it must later be bought back (generally at a lower price) and returned to the broker.

Bank Loan Repo And Reverse Bank Loan Repo

Reference is now made to FIG. 1, where a block diagram of a bank loan repurchase transaction 10 pursuant to some embodiments of the present invention is depicted. As depicted in FIG. 1, a bank loan repurchase transaction pursuant to some embodiments includes a buyer 12 interacting with a seller 14 to complete a transaction in which seller 14 transfers a bank loan 16 (which may be a single bank loan or a pool or portfolio of bank loans) to buyer 12 in exchange for some amount of loaned funds (and, typically, a transaction fee). Seller 14 may be required to pay buyer 12 a periodic payment on the loan. The terms of this transaction are preferably set forth in a bank loan repurchase agreement between the two parties. In some embodiments, buyer 12 is a financial institution or a broker/dealer which is in the business of lending funds.

In some embodiments, buyer 12 is a "repo desk" or other entity which regularly enters into repurchase agreements. In some embodiments, seller 14 is an entity, such as a financial institution or bank, which enters into bank loan transactions (e.g., as a lender to obligors such as corporations). For example, seller 14 may be a financial institution holding one or more bank loans which are being repaid by one or more obligors. In some embodiments, seller 14 is an investor which invests in bank loans. Embodiments of the present invention allow seller 14 to take advantage of the value of a bank loan (or a portfolio of bank loans) by transferring bank loan 16 to buyer 12 in exchange for funds. As will be described further below, some embodiments of the present invention allow seller 14 to hedge against risk associated with other investments (including investments in bank loans).

In a typical transaction pursuant to some embodiments of the present invention, seller 14 and buyer 12 agree to enter into a bank loan repurchase agreement. At some point in the transaction, typically as an initial matter, the parties identify one or more bank loans held by seller 14 (or which will be held by seller 14) and which buyer 12 wishes to receive as collateral. Each bank loan is typically identified by its obligor, a tranche, a value, and other terms which allow the parties to assess a value and loss risk associated with the loan. In some embodiments, information about the bank loan may be received from third party information providers (e.g., such as a bank loan rating or other information provided by Standard & Poors, the Loan Pricing Corporation, or the like).

A number of terms may be specified in the bank loan repurchase agreement between the parties. For example, the parties may identify: a purchase date (or the date on which the agreed-upon transfer will occur); the loan margin that will be paid from seller 14 in exchange for funds from buyer 12; a repurchase date (the date on which the bank loan will be reconveyed from buyer 12 back to seller 14); a pricing rate (a per annum percentage rate used to calculate the lending fee charged by buyer 12); and a market value of bank loan 16. The market value of bank loan 16 may be established by the parties in accordance with reasonable market standards or it may be established by reference to agreed-upon market data sources. For example, the market value may be established by reference to loan pricing screens maintained by the Loan Syndications and Trading Association, Inc. (the "LSTA") and/or by the Loan Pricing Corporation (the "LPC"). In some embodiments, the market value is reassessed each day (or, in some embodiments, on some other periodic basis such as weekly) during the term of a term repurchase agreement. Applicant believes that such "marking to market" will aid in reducing credit risk associated with bank loan repurchase agreements.

Based on a number of considerations, the parties identify an agreed-upon amount of funds to be provided by buyer 12 to seller 14 in exchange for a transfer of bank loan 16. Buyer 12 typically also charges seller 14 a repo margin amount (e.g., the amount by which the market value of bank loan 16 exceeds the value of the funds provided by buyer 12). This repo margin amount is also referred to as the buyer's "haircut".

Pursuant to some embodiments, seller 14 retains all economic benefits of bank loan 16 while assigning all rights in bank loan 16 (including voting rights) to buyer 12. The parties agree to a payment amount to be paid on a periodic basis by seller 14 to buyer 12. In some embodiments, this payment amount is paid daily and is calculated by applying the pricing rate to the purchase price on a 360 day per year basis for the actual number of days during the term of the repurchase agreement. In some embodiments, the repurchase agreement further specifies that the parties agree that seller 14 will repurchase bank loan 16 (or its substantial equivalent) at a specified date (the end of the term) for a specified repurchase amount.

In this manner, both parties realize a number of benefits. For example, seller 14 receives a sum of cash while retaining economic benefits of its pool of bank loans 16. Seller 14 may utilize this cash to make other investments providing a different risk and/or return (or, as will be described in an example set forth below, seller 14 may use the funds to leverage its investment in a bank loan having a greater value). Buyer 12 receives a margin payment (or fee) and a periodic payment amount in exchange for a (typically) short-term loan of funds. At the end of the term of the repurchase agreement, buyer 12 conveys the bank loans back to seller 14 in exchange for an agreed-upon amount. Both parties benefit from a potential improved return on equity and return on capital associated with bank loans, as well as increased financial flexibility. Further, the use of a repurchase agreement pursuant to embodiments of the present invention may allow seller 14 to avoid forced selling to meet bank loan redemptions or to repay bank lines of credit.

While still referring to FIG. 1, an example transaction illustrating features of some embodiments will now be described. In the example, seller 14 is an entity with $10 Million of available funds to invest. In particular, seller 14 wishes to invest funds in bank loans (e.g., seller 14 may determine that the risk/reward characteristics associated with bank loan investments are particularly attractive). Prior to introduction of embodiments of the present invention, seller 14 was unable to readily leverage its funds in a bank loan investment. That is, seller 14 was limited to acquiring a pool of bank loans valued at $10 Million. As an example, if the pool is a Libor+3.00% pool (where Libor is 3.00%), and if the pool appreciates by 1.00%, seller 14 would enjoy a return on equity of 7.00% (or approximately $0.1 Million plus carry).

Now, utilizing features of some embodiments of the present invention, seller 14 may leverage its investment to realize greater returns.

For example, seller 14, using techniques of some embodiments of the present invention, may choose to perform a bank loan repurchase transaction with buyer 12 to magnify the risk/reward profile of the investment. The transaction may generally proceed as follows. Seller 14 identifies a pool of bank loans that it wishes to invest in. Seller 14 and buyer 12 negotiate terms of a bank loan repurchase agreement. Based on its assessment of the risks associated with the transaction (and based on the amount of funds to be contributed by seller 14) buyer 12 may offer to provide seller 14 with $100 Million of funds, allowing seller 14 to acquire $110 Million of bank loans (assuming that buyer 12 charges a haircut of 10%, allowing it to provide 91% of the total market value of the pool of bank loans to seller 14). The transaction is structured as a bank loan repurchase transaction where the pool of bank loans is assigned to buyer 12 with an agreement that the bank loans are resold to seller 14 at the end of the term. In this manner, seller 14 enjoys a greater potential return on equity for assuming greater exposure through borrowing. For example, if the $110 Million portfolio appreciates 1%, seller 14 enjoys a profit of approximately $1.1 Million (plus carry). That is, seller 14 receives $1 Million more for its investment than if it had not entered into a bank loan repurchase agreement pursuant to embodiments of the present invention.

To further illustrate some embodiments of the present invention, a further example will now be described. The example is based on the following assumptions: (1) Libor is 2.00%; (2) the subject bank loan portfolio has a value of $100 Million; (3) the seller is a hedge fund wishing to receive funds from a buyer; (4) the buyer is willing to provide 91% of the value of the bank loan portfolio (i.e., $90,909,090); (5) interest is assessed at Libor+1.00%; and (6) carry of Libor+3.00% is paid.

In this example, a return on equity of approximately 25% is realized and the client receives funds which may be used to invest in other assets, such as securities. The return on equity may be calculated as follows: The carry paid to the seller is equal to $5 Million (calculated as $100 Million*5.00%). The interest paid by the seller is equal to $2,727,272 (calculated as $90,909,090*3.00%). The net return is equal to $2,272,727 (calculated as $5 Million minus $2,727,272). The return on equity is 25% (calculated as the net return divided by the equity, or $2,272,727/$9,090,909).

A number of variables may be adjusted by the parties to arrive at a transaction which satisfies different risk/reward objectives of the parties. For example, buyer 12 may charge a higher or a lower fee or haircut depending on how much credit risk buyer 12 believes is associated with a particular pool (e.g., a higher fee would be charged if the risk is greater). Buyer 12 may also assess a higher haircut if seller 14 has a smaller cash equity position. Of course, the larger haircut will reduce the return on equity which may be realized by seller 14.

Applicant has discovered that a number of repurchase agreement terms and conditions provide desirable results (although upon reading this disclosure, those skilled in the art will appreciate that other terms and conditions may provide suitably desirable results). For example, Applicant believes the following terms provide desirable results: financing a pool of bank loans (rather than a single name); the use of syndicated bank loans as collateral rather than other types of loans; the use of U.S. dollars or U.K. pounds as the collateral currency; a seller domiciled in either North America or Western Europe; full assignment of the bank loans by seller; a repurchase rate of approximately between Libor+62.5 basis points and Libor+87.5 basis points; a haircut of between approximately 15% to 39% (paid to the buyer of the collateral); and a weekly mark to market using either LSTA or LPC loan pricing data.

Figure 2:
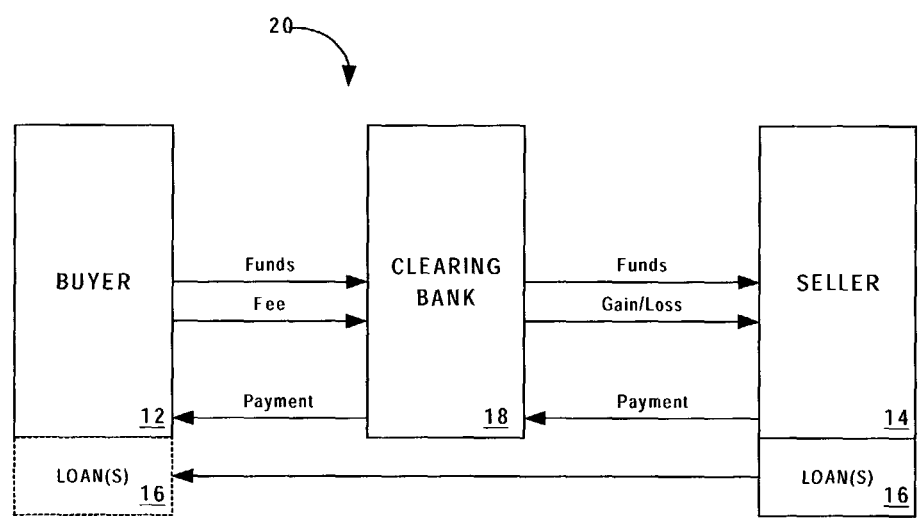
FIG. 2 is a block diagram of a further bank loan repurchase transaction consistent with embodiments of the present invention.

Bank loan repurchase agreements pursuant to some embodiments may be implemented using an intermediary. Referring now to FIG. 2, a bank loan repurchase transaction 20 is depicted which involves the use of a clearing bank 18 as an intermediary between buyer 12 and seller 14. The transaction is performed using similar techniques as described above in conjunction with FIG. 1, except that an intermediary is utilized to pass funds.

Figure 3:
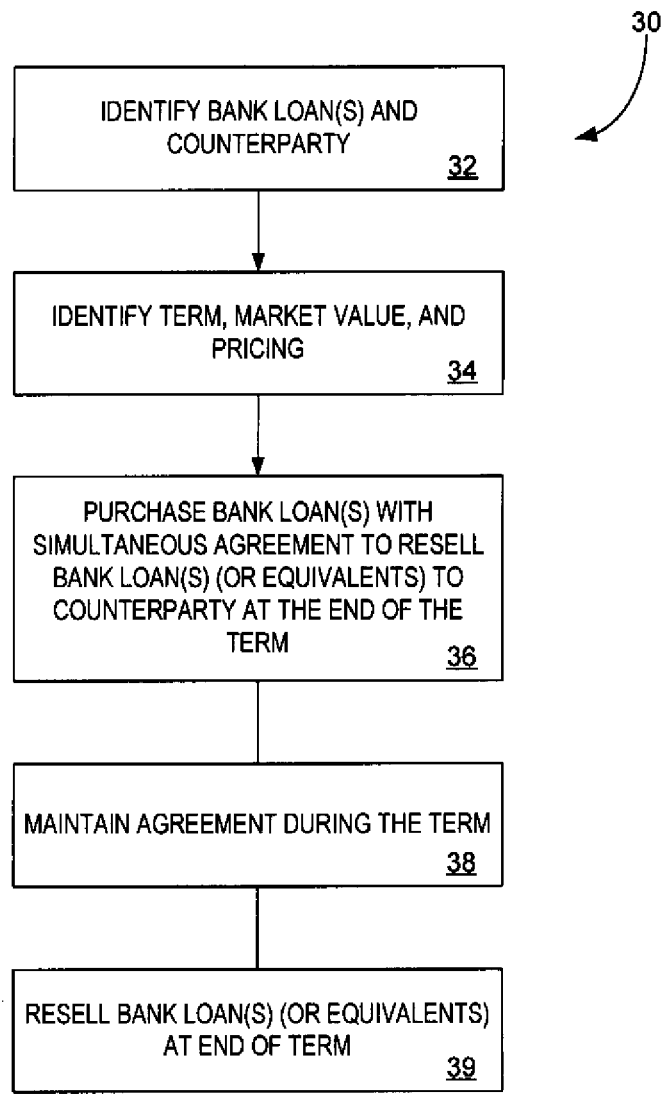
FIG. 3 is a flow diagram illustrating an exemplary process for conducting a bank loan repurchase transaction pursuant to one embodiment of the present invention.

Reference is now made to FIG. 3, where a flow diagram is depicted which indicates steps which may be taken by parties to enter into a bank loan repurchase (or reverse bank loan repurchase) agreement pursuant to some embodiments of the present invention. In some embodiments, the relative timing and positioning of the steps of the flow diagram may be performed sequentially or in a different order than depicted. In some embodiments, as will be described further below, some or all of the steps may be performed by, or with the assistance of, one or more computing devices.

Transaction process 30 begins at 32 where counterparties (e.g., a buyer and a seller) are identified as is one or more bank loans which the parties wish to transfer using a repurchase agreement. In some embodiments, the bank loans may be selected from among a number of available names available for repurchase. Once the parties agree on the identity of the bank loans, the process continues at 34 where the parties negotiate to identify substantive repurchase terms, including, for example, the term of the repurchase, the market value of the bank loans, and other pricing (e.g., including the haircut to be paid to the buyer, the repurchase rate, etc.). The parties may consider a number of combinations of terms to select the combination which best satisfies the objectives of both the buyer and the seller.

The process continues at 36 where the transaction is conducted. The buyer purchases the bank loans with a simultaneous agreement to resell them to the seller at the end of the term. The agreed-upon price to be paid for the loans is provided to the seller (which may be reduced, for example, by a haircut or other fee). The process continues at 38 where the agreement is maintained during the term. For example, this may include performing a daily or weekly "mark to market" by retrieving pricing information from a source such as LSTA and/or LPC. This may also include performing a daily calculation of any price differential to determine any fees owing to either the buyer or the seller (based on the daily market price of the bank loans).

At the end of the term, the bank loans are resold to the seller (at 39). If the bank loans have been the subject of default or otherwise are not available to be resold to the seller, the parties may interact to identify a suitable substitute to be conveyed to seller. This transfer typically involves some transfer of funds between the parties. Upon completion, the bank loans (or their equivalents) are back in the possession of the seller. Similar processes may be used to conduct reverse bank loan repurchase transactions.

Hedging Using Bank Loan Repo And Reverse Repo

Applicant has further developed techniques allowing the use of bank loan repurchase agreements to hedge against portfolio risk. For example, Applicant has developed techniques allowing entities to short bank loans. In this manner, investors and underwriters may utilize short-selling of bank loans to reduce or manage the risks associated with investments in bank loans and securities.

In general, some embodiments of the present invention provide investors with an ability to take a short position in bank loans. As a result, investors may mitigate unexpected negative market conditions. Further, by appropriate selection of bank loan portfolios and repurchase agreement terms, investors may mitigate unexpected negative market conditions without substantial losses in investment return. Applicant believes that shorting bank loan positions is an efficient and desirable way for investors to shorten exposure to the market, to a sector, or to a particular item of credit. Further, the ability to short a specific bank loan allows an investor to monetize a bearish view on the loan (e.g., whether the view is bearish with respect to the particular position or with respect to the sector in general). Applicant believes that the ability to short a position in a bank loan is a more cost effective investment than alternatives (e.g., such as entering into a credit derivative contract where bid/asks are wide), and that there is less correlation risk in shorting bank loans than in shorting bonds or equities as a hedge for an investment in a bank loan portfolio.

Figure 4:
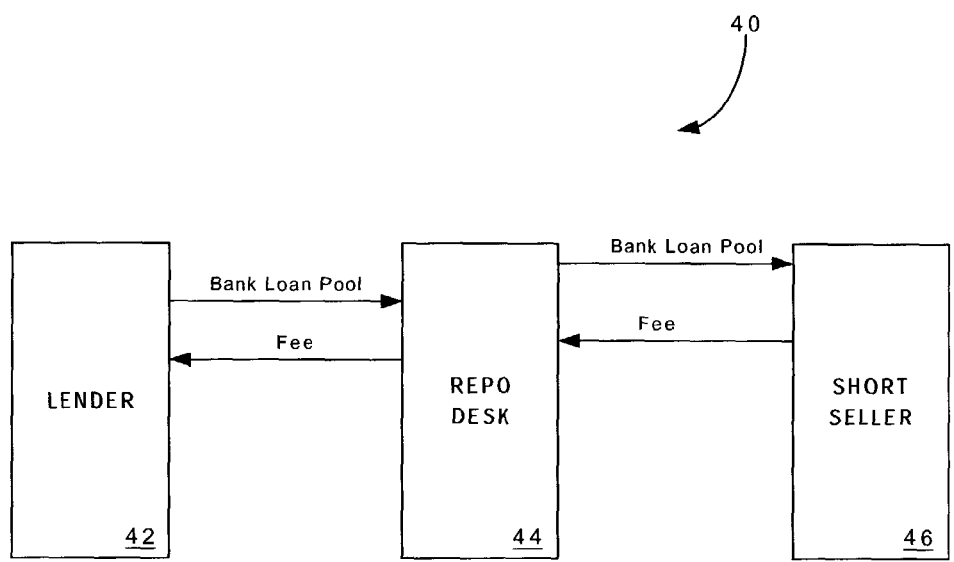
FIG. 4 is a block diagram of a bank loan shorting transaction pursuant to one embodiment of the present invention.

Reference is now made to FIG. 4, where a transaction 40 is depicted in which a pool of bank loans 18 is shorted. As depicted, a lender 42 (such as a CDO or financial institution) holds bank loans 18. In a reverse repurchase transaction, bank loans 18 are borrowed by a repo desk 44 from lender 42 (in exchange for a first fee). Repo desk 44 lends bank loans 18 to short seller 46 in exchange for a shorting fee. Bank loans 18 are borrowed from lender 42 in exchange for a lending fee (typically on the order of 25 basis points, for example). In some embodiments, a pool of bank loans 18 is borrowed from lender 42 to minimize exposure to individual loan risk. In some embodiments, the borrow of bank loans 18 is secured with collateral (e.g., such as cash or securities). By borrowing bank loans 18 from lender 42, repo desk 44 builds an inventory of available bank loans which may be shorted by short sellers 46. In some embodiments, repo desk 44 borrows a number of bank loans 18 from one or more lenders 42 to build a diverse inventory of bank loans. Repo desk 44 makes these bank loans available to a number of short sellers 46. In this manner, for example, each short seller 46 may select the bank loan (or bank loans) 18 which exhibit desired risk/return and other characteristics in order to hedge a long position held by short seller 46.

In some embodiments, repo desk 44 may build an inventory of available bank loans by conducting a number of reverse bank loan repurchase transactions with one or more buyer(s). For example, repo desk 44 may interact with a hedge fund such that the hedge fund finances the purchase of a pool of bank loans 18 by putting up some capital and borrowing the remainder from repo desk 44 in exchange for a fee (e.g., such as a borrowing rate of approximately Libor+0.075% or the like). The bank loans 18 are then put up as collateral.

Figure 5A:
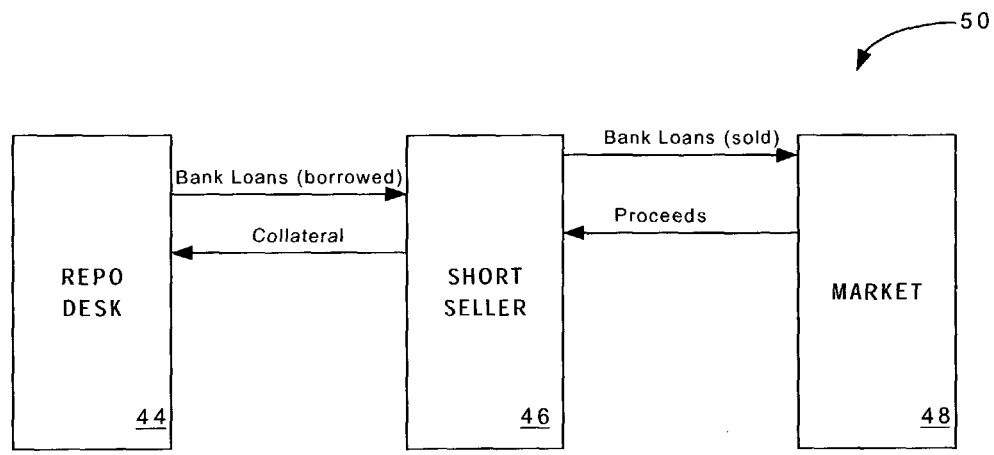
FIGS. 5A and 5B are block diagrams of a bank loan shorting transaction pursuant to some embodiments of the present invention.
Figure 5B:
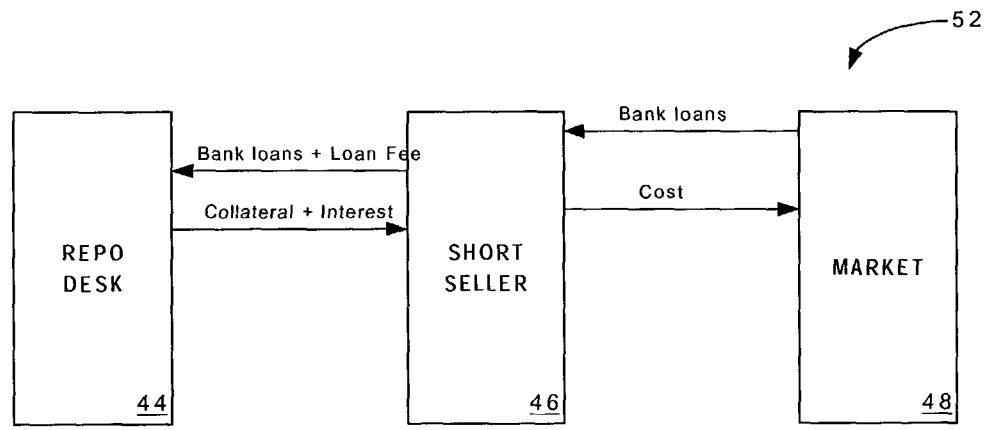

In either approach (or in a combination of the two), repo desk 44 acts to build a borrowed inventory of bank loans or "names" available for borrow by short sellers. Reference is now made to FIGS. 5A and 5B where transactions 50, 52 are depicted representing a short sale of bank loans pursuant to some embodiments of the present invention. Referring first to FIG. 5A, a transaction 50 is depicted which shows the borrowing of bank loans 18 by a short seller 46 and the subsequent sale of the borrowed bank loans 18 to the market 48. In this transaction, short seller 46 borrows one or more bank loans 18 from repo desk 44, preferably after identifying the bank loans from one or more available bank loans as having desirable risk/return characteristics. For example, short seller 46 may select the bank loans 18 to hedge against a long position it holds in one or more other bank loans 18. As another example, short seller 46 may select the bank loans 18 to hedge against a long position it holds in one or more securities (e.g., such as bonds or the like).

Short seller 46 may take a number of considerations into account when selecting bank loans 18 to short. For example, short seller 46 may generally attempt to establish a long position of bank loans having good credit risk and a short position in bank loans having poor credit risk. Bank loans having poor credit risk may be identified based on a negative view from a credit analysis or the like. Further, short seller 46 may select bank loans 18 to short based on a desire or need to shorten a particular exposure to an industry or a particular exposure to an obligor. Further, short seller 46 may select bank loans 18 to short based on a value analysis (e.g., by analyzing the relative value or pricing of particular loans to identify loans trading at or above par).

Once short seller 46 selects bank loans 18 to short, short seller 46 borrows the loans in exchange for some agreed-upon collateral. The terms and conditions of the borrow may include terms such as: a length or term of the borrow, a loan fee to be paid to repo desk 44, an amount and type of collateral required, etc. The amount of collateral required may depend on the relationship between short seller 46 and repo desk 44, the nature of the bank loans borrowed, the market value of the bank loans, or the like. For example, repo desk 44 may require that short seller 46 provide 102% of the market value of the bank loans in cash or other securities. As a simple example, repo desk 44 may loan a pool of bank loans having a market value of $100 Million to short seller 46. Short seller 46 may be required to deposit collateral valued at $102 Million with repo desk 44.

Short seller 46 then offers the borrowed bank loans 18 to the market 48 for sale. For example, short seller 46 may offer the borrowed bank loans 18 for sale to the market at the current market price. Once a buyer is found, short seller 46 sells the loans and receives proceeds from the sale. Continuing the example introduced above, short seller 46 may sell the pool of bank loans 18 to the market for proceeds of $100 Million.

At the end of the term of the shorting agreement (or at some prior time at the option of the parties), the transaction continues as depicted in FIG. 5B. As depicted, at the end of the term (and assuming short seller 46 was able to sell the borrowed bank loans to the market as described above), short seller 46 purchases the same (or acceptably similar as defined in the bank loan borrow agreement) bank loans from the market 48. Short seller 46 then acts to return the borrowed bank loans 18 to repo desk 44. In addition, short seller 46 pays repo desk 44 a loan fee at an agreed-upon rate. Continuing the example introduced above, repo desk 44 and short seller 46 may have agreed that the loan fee was 3.00%. In the example, upon return of the borrowed bank loans 18, short seller 46 pays a loan fee equal to $100 Million*(3.00%)/the term.

In this manner, short seller 44 realizes a number of benefits. First, if the borrowed bank loans 18 are selected to offset or hedge against risk in a long position in similar bank loans, the short seller 44 enjoys downside protection. Further, if short seller 44 uses borrowed bank loans 18 to offset or hedge long positions in bank loans, short seller 44 enjoys tighter correlation between the two sets of bank loans. Other approaches to hedging bank loan risk utilize securities, such as bonds, to hedge. The correlation between these two types of investments is generally not as certain as provided by embodiments of the present invention. Other benefits include reduced overall portfolio volatility, improved portfolio returns, and better positioning for significant market downturns.

Applicant believes that techniques of some embodiments of the present invention may be used to provide desirable benefits in reducing volatility in a bank loan portfolio. In a bank loan portfolio which only includes long positions, systematic volatility exists due to the inherent correlation between pairs of individual loans. In a market crisis, volatility as well as correlation may increase, resulting in a diminished diversification effect in a long-only portfolio. Application of techniques of some embodiments of the present invention can reduce this volatility and improve correlation. Further, Applicant believes that creation of a portfolio using short bank loan positions can provide an improved correlation even in a market crisis, thereby improving the overall volatility of the portfolio. An example of one approach to creating a portfolio including long and short bank loan positions will now be described by reference to Tables 1 and 2 below.

In the example, several assumptions are made, including the assumptions that all bank loans in the portfolio have the same individual monthly volatility (i.e., 1.0%), and that each pair of loans (a pair including a short and a long position) is correlated by the same amount (i.e., with examples for both 25% and 75%). These tables depict the monthly volatility of long/short portfolios under different assumptions on the numbers of long and short positions in each portfolio. For example, referring to Table 2, if a portfolio includes 25 longs and 10 shorts and the correlation is 25%, the portfolio volatility will be approximately 0.26%. The tables illustrate some of the benefits of shorting bank loans pursuant to embodiments of the present invention. For example, referring to Table 1, a portfolio of 25 loans in a long-only portfolio, with a 25% correlation, reduces volatility from 1.00% (in a portfolio with only a single loan) to 0.53%. Having more than 25 loans in a long-only portfolio provides relatively little additional volatility reduction. If correlations increase to 75%, then the portfolio monthly volatility rises.

Referring to Table 2, it is shown that the volatility reduction is substantial in portfolios having a number of loans and having a number of short positions. For example, in a portfolio with 25 long positions and 10 short positions, portfolio volatility is approximately 0.26%. In a crisis where correlations increase to 75%, the portfolio volatility is still a low 0.38%. That is, bank loan portfolios having long and short positions are more immune to correlation changes than are long-only portfolios. Applicant believes that portfolios constructed having the same number of long and short positions reduce portfolio volatility even further (although this reduction is at the expense of reduced income). Accordingly, in some embodiments, a portfolio blend may be selected having sufficient numbers of shorts to reduce volatility while reducing the expense of shorts.

TABLE 1

Bank Loan Pools with no Shorting

| | | Pairwise Correlation | |
|---|---|---|---|
| | | 25% | 75% |
| # Longs | # Shorts | Monthly Volatility | |
| 1 | 0 | 1.00% | 1.00% |
| 5 | 0 | 0.63% | 0.89% |
| 10 | 0 | 0.57% | 0.88% |
| 25 | 0 | 0.53% | 0.87% |
| 50 | 0 | 0.51% | 0.87% |

TABLE 1-continued

Bank Loan Pools with no Shorting

| | | Pairwise Correlation | |
|---|---|---|---|
| | | 25% | 75% |
| # Longs | # Shorts | | Monthly Volatility |
| 100 | 0 | 0.51% | 0.87% |
| 1000 | 0 | 0.51% | 0.87% |

TABLE 2

Bank Loan Pools with Shorting

| | | Pairwise Correlation | |
|---|---|---|---|
| | | 25% | 75% |
| # Longs | # Shorts | | Monthly Volatility |
| 1 | 1 | 0.61% | 0.35% |
| 10 | 5 | 0.28% | 0.32% |
| 10 | 10 | 0.19% | 0.11% |
| 25 | 10 | 0.26% | 0.38% |
| 50 | 25 | 0.19% | 0.29% |
| 100 | 50 | 0.06% | 0.04% |
| 100 | 100 | 0.06% | 0.04% |
| 1000 | 500 | 0.17% | 0.29% |
| 1000 | 1000 | 0.02% | 0.01% |

Figure 6:
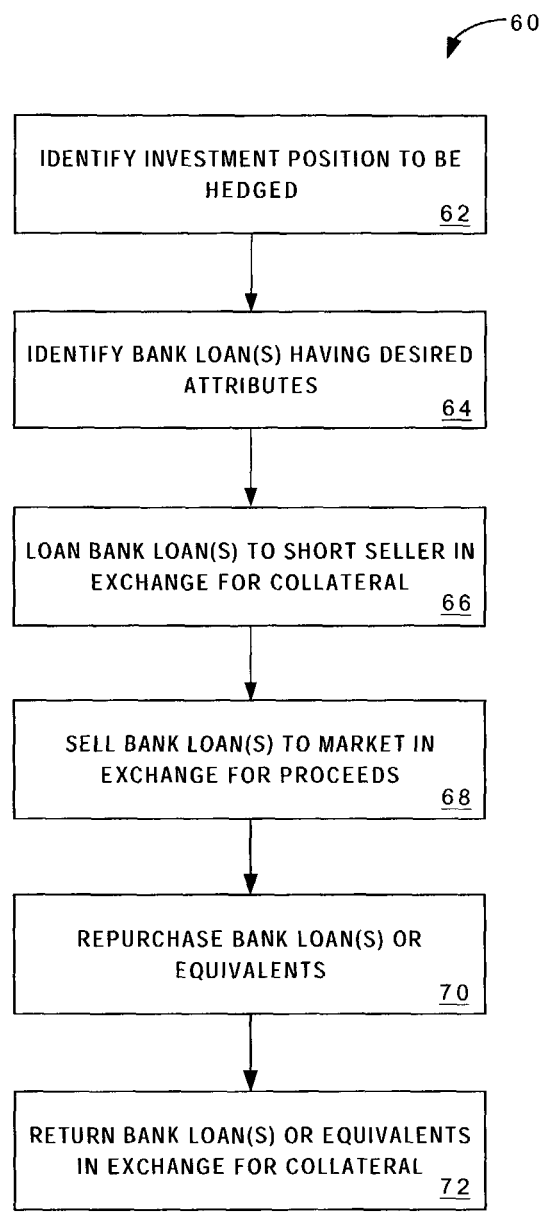
FIG. 6 is a flow diagram illustrating an exemplary process for conducting a bank loan shorting transaction pursuant to some embodiments of the present invention.

Reference is now made to FIG. 6, where a flow diagram is depicted illustrating an exemplary process 60 for conducting a bank loan shorting transaction pursuant to some embodiments of the present invention. Process 60 may be performed by, or on behalf of, an entity wishing to hedge a position (the "short seller"). For example, process 60 may be performed by a short seller which holds a long position in bank loans and desires to hedge against a potential risk of loss in the long position. Process 60 may begin at 62 where the short seller identifies an investment position to be hedged. Because embodiments of the present invention allow the shorting of bank loans, the investment to be hedged identified at 62 may be, for example, a long position in bank loans. However, those skilled in the art, upon reading this disclosure, will appreciate that other positions may also be desirably hedged by taking short positions in bank loans (e.g., risks associated with long positions in bonds may be desirably offset with short positions in bank loans pursuant to some embodiments of the present invention). For the purposes of describing FIG. 6, the position identified at 62 is a long position in a pool of bank loans.

Process 60 continues at 64 where one or more bank loan(s) are identified which have desired attributes. For example, the short seller may contact a repo desk (e.g., such as the repo desk 44 described above in FIG. 5) which has an inventory of bank loans available for borrow. The short seller evaluates each of the loans available for borrow to identify one or more bank loans which, if shorted, would provide a desirable hedge against the long position held by the short seller. Further details of this analysis will be described below in conjunction with FIG. 7.

Once one or more bank loan(s) are identified, process 60 continues at 66 where the bank loan(s) are loaned to the short seller in exchange for some collateral. This loan is conducted, for example, as described above in conjunction with FIG. 5. Process 60 continues at 68 where the short seller sells the borrowed bank loan(s) to the market in exchange for proceeds. At the end of the borrow period, for example, processing continues at 70 where the short seller repurchases or acquires the bank loan(s) (or some suitable equivalents). The repurchased bank loan(s) (or their equivalents) are returned to the repo desk in exchange for a return of the collateral. A fee may be paid to the repo desk for this transaction. In this manner, short seller may utilize a short position in bank loan(s) to hedge against risk associated with a long position. In some embodiments, some or all of the steps of process 60 may be automated (e.g., using the devices described below in conjunction with FIGS. 8-10).

Selecting A Position

Figure 7:
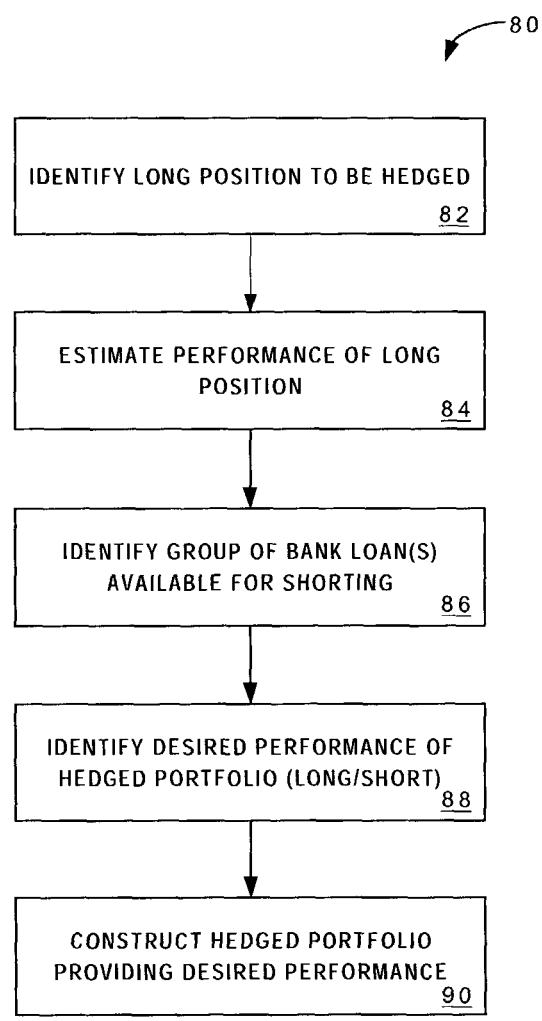
FIG. 7 is a flow diagram illustrating an exemplary process for selecting a position pursuant to some embodiments of the present invention.

Reference is now made to FIG. 7, where a process 80 is depicted for selecting a hedged position. Process 80 may be performed in conjunction with, or prior to, process 60 described above in conjunction with FIG. 6. Process 80 may be performed by, or on behalf of, an entity holding a long position in an investment. Pursuant to some embodiments, process 80 may be performed by an entity holding a long position in an investment in a bank loan or portfolio of bank loans and who wishes to hedge against risk associated with the long position by shorting one or more bank loans. For convenience, the entity is referred to as the "short seller".

Process 80 begins at 82 where a long position to be hedged is identified. For example, a short seller may hold a number of long positions in a variety of investments, including long positions in bank loans. The short seller may determine that a particular long position involves undesirable risk that should be hedged. The short seller may determine that a particular long position involves risk that is readily hedged using features of embodiments of the present invention. Once the position is identified, process 80 continues at 82 where the performance of the long position is estimated. For example, a long position in pool of bank loans may be analyzed to identify an expected return on equity ("ROE") of the investment. The ROE of a portfolio of bank loans is generally calculated as equal to $L+(S-F-cl)/E$, where L is the Libor rate (assuming that the average price of the loans in the pool is at par), E is the equity set aside for the portfolio, S is the effective spread, cl is the expected credit losses incurred by the portfolio, and F is funding over Libor used to finance the portfolio (e.g., the repo rate) less the fee earned by lending securities (if applicable).

For example, an entity holding a portfolio in which $F=0.75\%$ and $S=3.00\%$ and which has 8% equity may enjoy a best-case ROE of around $L+31\%$ when there are no losses and a ROE of $L+6\%$ if credit losses are only around 2%. If the entity can earn 25 basis points ("bps") lending securities, but pays 75 bps for financing, its investment may be wiped out if portfolio losses exceed 10%. For context, banks that fund at Libor flat, but earn 25 bps lending loans, earn $L+41\%$ if there are no credit losses, earn $L+16\%$ for 2% losses, and $L-84\%$ if there are 10% credit losses. Further, hedge funds that leverage long positions using 15% equity earn $L+15\%$ if the portfolio has no losses but lose 52% of capital if portfolio losses are 10%. If the hedge fund investment suffers credit losses of 2%, then ROE is only $L+1.7\%$. As a further example, mutual funds that use 100% equity in their long positions earn $L+1.3\%$ when there are 2% credit losses.

Once performance of the long position has been analyzed, process 80 continues at 86 where a group of bank loan(s) available for shorting is identified. This identification may include reviewing a number of bank loan(s) collected and made available for borrow by a repo desk such as the repo desk 44 described above. In some embodiments, repo desk 44 may accumulate (through repurchase agreements) a number of different bank loans and make them available for borrow by short sellers. Once a group of bank loans available for short are identified, processing may continue at 88 where short seller may determine if a desirable hedged portfolio can be constructed using the available loans. The group of bank loans available for short may, for example, be analyzed to determine if they provide a desired correlation with the long positions held by the short seller (e.g., the correlations may be considered as described above in conjunction with Tables 1 and 2). Further, a number of different calculations may be performed to determine if a desirable hedged portfolio can be constructed. For example, short seller may analyze individual combinations of short positions with the long position.

In general, the following analysis may be performed to identify the overall ROE of a hedged position. The overall ROE is equal to: $L+[(1-H)*(S-cl)-F]/(E+H*hc)$, where the variables L, S, F, cl, and E are as described above, and where H is the ratio of the long versus the short position, and hc is the haircut associated with taking the short position. Those skilled in the art appreciate that a long/short portfolio has two forms of leverage: the leverage from the financing of the long positions, as well as the leverage of being long and short. As an example, if a short position in bank loans is assessed a haircut (hc) of 2%, then by hedging with short positions at a ratio of 2 to 3 (i.e., H=67%), a bank that leverages its long positions at 8% will lose around 22% if the market value declines by 10% (e.g., if there are credit losses of 10%). The bank will earn L+13% if there are no credit losses and L+6% if there are credit losses of 2%. As another example, a hedge fund which is leveraged at 15% in its long positions and is assessed a haircut of 2% for its short positions, and which hedges at a ratio of 2 to 3 (i.e., H=67%) will earn L+1.5% if there are no credit losses, but will lose 19% if there are credit losses of 10%. As a further example, a mutual fund which hedges at a ratio of 1 to 3 (i.e., H=33%) will earn L+2.2%, L+0.9%, and L−4.4% if credit losses are 0%, 2% and 10% respectively.

In some embodiments, processing at 88 may include identifying other attributes of the overall portfolio which may be modified. For example, the short seller may determine that it should reduce risk in the long positions by allocating more equity to the long positions (i.e., increasing ROE by increasing E). For example, equity may be increased by an amount equal to $(1+H)*E$.

As another example, the short seller may determine that it wishes to maintain the same overall credit risk exposure with existing long positions, but desires to hedge against credit risk in new long positions. For example, if the short seller has an existing long position of $100 Million, it may wish to build new long and short positions of H size (giving the entity a total portfolio of $(1+H)*100 Million (long) plus H*$100 Million (short)). The total ROE of this new portfolio is calculated as: $L+[S-(1+H)*F-cl]/[(1+H)*E+(H*hc)]$.

As a further example, the short seller may determine that it wishes to maintain the amount of equity that it has in its total portfolio, but would like to add short positions in bank loans to hedge against loss risk. As a specific example, the short seller may have a $100 Million (long) position with $15 Million equity, and wishes to maintain that amount of equity while building short positions. If the entity shorts $15 Million and is haircut at 5%, it uses $0.75 Million in equity and will need to unwind at least $5 Million of the long positions to keep the total equity at $15 Million. If the short seller shorts H units, then it needs to unwind at least $(H*hc)/E$ units of long positions. The ROE of this hedged portfolio may be calculated as: $L+[(1-H*hc/E)*(S-F)-H]*[S-(1-H-H*hc/E)*cl/E]$.

In general, processing at 88 and 86 may be an iterative process in which a short seller identifies one or more bank loans to take a short position in. The bank loans, and the terms of the borrow, may be selected to provide a desired hedged portfolio ROE as described above. Processing continues at 90 where the hedged portfolio is constructed which provides the desired portfolio performance. The hedged portfolio may be constructed by borrowing the selected bank loans as described above. Those skilled in the art will appreciate that a number of hedged portfolios may be constructed using techniques of embodiments of the present invention.

Network Embodiments

Figure 8:
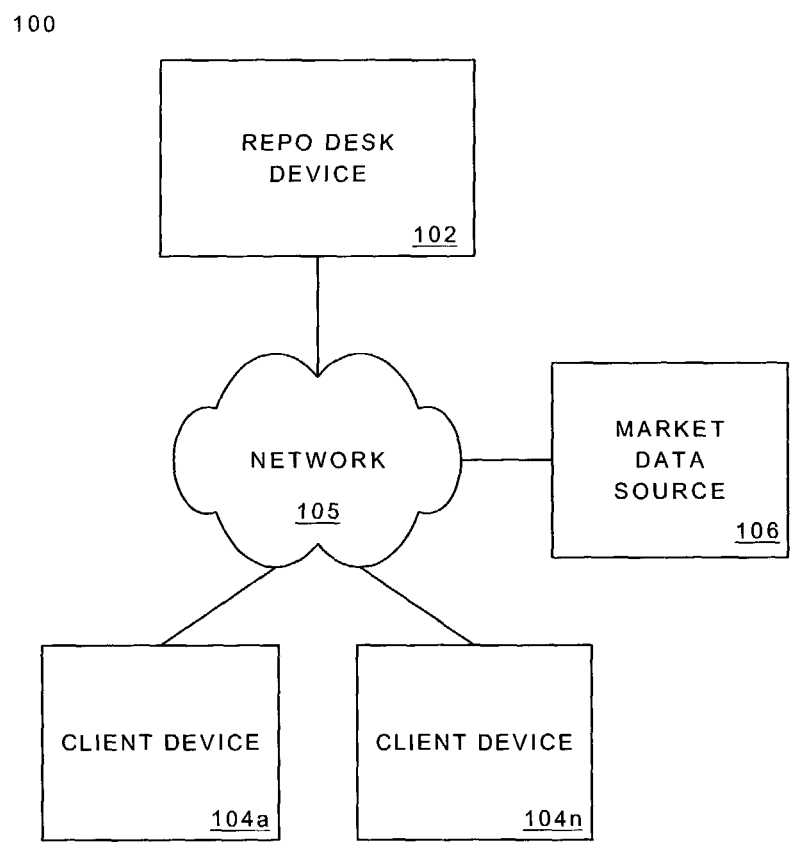
FIG. 8 is a block diagram depicting a system consistent with embodiments of the present invention.

Embodiments of the present invention may be implemented in a computer-based system such as the system depicted in FIG. 8. As depicted in FIG. 8, a system 100 includes one or more repo desk devices 102 in communication with one or more client devices 104*a-n* over a communication network 105. The devices may further be in communication with one or more market data sources 106. The devices may interact to assist entities operating the devices to enter into bank loan repurchase agreements pursuant to embodiments of the present invention.

Repo desk device 102 may be one or more devices or systems operated by, or on behalf of, an entity which acts to operate a bank loan repurchase desk. Client devices 104*a-n* may be one or more devices or systems operated by, or on behalf of, entities that wish to acquire, sell, borrow, or lend bank loans using techniques of embodiments of the present invention. Repo desk device 102 and/or client devices 104 may be operated by, or on behalf of, entities such as, for example: broker-dealers, inter-dealer brokers, investment managers, financial institutions, a qualified investor, or the like. For example, a financial institution wishing to enter into a bank loan repurchase agreement with a repo desk may interact with the repo desk using client device 104 in communication with repo desk device 102. In this manner, bank loan repurchase agreements may be entered into in an efficient manner.

Market data source 106 may be one or more sources of market data used to assist in the pricing, evaluation, and completion of bank loan repurchase agreements entered into pursuant to embodiments of the present invention. For example, market data sources may include sources of bank loan information such as those offered by the Loan Pricing Corporation, Standard & Poors, etc.

Any number of entities and devices (e.g., such as devices 102, 104, 106) may be provided in system 100. Communication between devices 102-104 and market data sources 106 may be direct or indirect, such as over the Internet through a Web site maintained by a remote server or over an on-line data network including commercial on-line service providers, bulletin board systems and the like. For example, in some embodiments, a central service may be operated to facilitate the pricing, evaluation and execution of bank loan repurchase transactions pursuant to embodiments of the present invention.

Any of a number of different types of networks or communications techniques may be used to facilitate communication between (and within) entities operating devices 102, 104, 106. For example, communication may be via a Local Area Network (LAN), a Metropolitan Area Network (MAN), a Wide Area Network (WAN), a proprietary network, a Public Switched Telephone Network (PSTN), a Wireless Application Protocol (WAP) network, a wireless LAN (e.g., in accordance with the Institute of Electrical and Electronics Engineers 802.11 standard), a Bluetooth network, an Infrared Radiation (IR) network, and/or an IP network such as the Internet, an intranet or an extranet. As used herein, the term "communications" can refer to wired and/or wireless communications as appropriate. Note that the devices shown in FIG. 8 need not be in constant communication.

Figure 9:
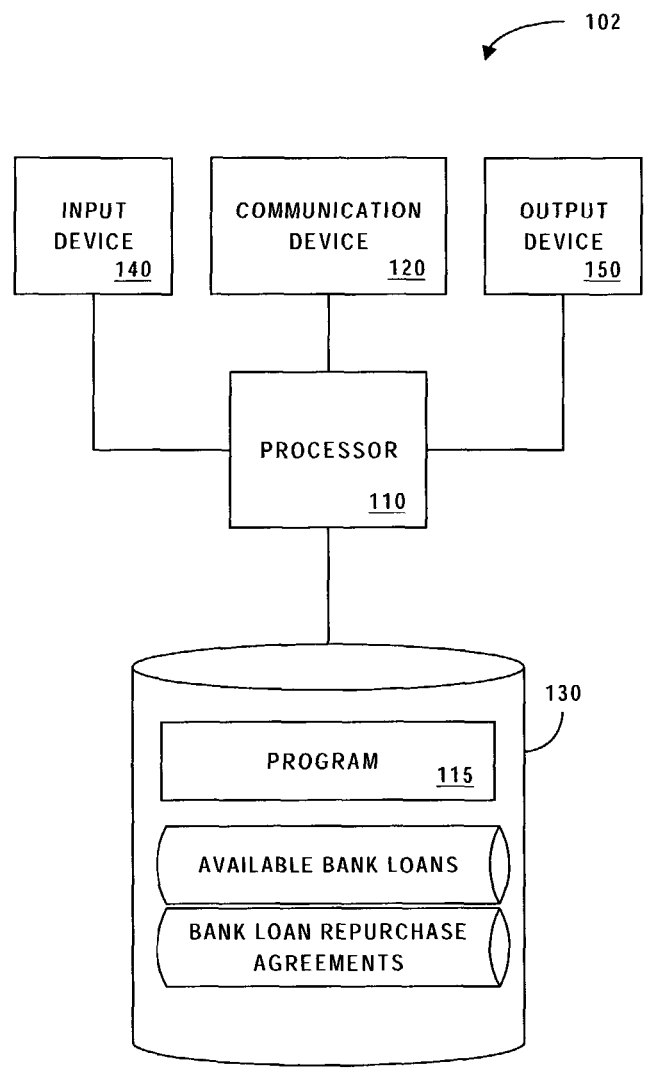
FIG. 9 is a block diagram of one embodiment of a repo desk for use in conjunction with the system of FIG. 8.

Any or all of the devices 102-106 may comprise computers, such as those based on the Intel® Pentium® processor. Any or all of the devices may be, e.g., conventional personal computers, portable types of computers, such as a laptop computer, a palm-top computer, a hand-held computer, or a Personal Digital Assistant (PDA). Any or all of the devices 102-106 may further comprise or include other communication devices, such as, for example, wired or wireless telephones, etc. Further details of an example repo desk device 102 is shown at FIG. 9. Similarly-configured devices may be used as devices 104-106.

As depicted in FIG. 9, some devices used in conjunction with the present invention (such as, for example, repo desk device 102) include one or more input devices 140, one or more communication devices 120, one or more output devices 150, one or more storage devices 130, all of which are in communication with one or more processing devices 110 to perform processing pursuant to embodiments of the present invention.

Communication device 120 may be used to facilitate communication with, for example, other devices (such as client devices 104 and sources of market data 106). Input device 140 may comprise, for example, a keyboard, a keypad, a mouse or other pointing device, a microphone, knob or a switch, an infra-red (IR) port, a docking station, and/or a touch screen. Input device 140 may be used, for example, to enter information (e.g., information regarding routing rules, option orders, or the like). Output device 150 may comprise, for example, a display (e.g., a display screen), a speaker, and/or a printer.

Storage device 130 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 130 stores one or more programs 115 for controlling processor 110. Processor 110 performs instructions of program 115, and thereby operates in accordance with the present invention. In some embodiments, program 115 may include a rule-based engine which applies bank loan repurchase rules established by or on behalf of repo desk 102 to bank loan repurchase agreement requests submitted by clients operating client devices 104. In some embodiments, program 115 may generally be configured as a program using techniques known to those skilled in the art to achieve the functionality described herein. For example, program 115 may be coded to perform some or all of the steps of the process depicted in FIG. 3 and/or in FIG. 6. As a more particular example, program 115 may be coded to allow clients to interact with repo desk 102 to identify one or more bank loan(s) to repurchase or to borrow; to identify one or more repurchase agreement provisions; to price and evaluate potential repurchase agreement transactions; to generate documentation supporting a particular bank loan repurchase agreement; to maintain a particular bank loan repurchase agreement during the term of the agreement; etc.

Storage device 130 may also store one or more databases, including, for example, databases including information identifying one or more bank loans available for borrow or available for repurchase, databases including information identifying specific repurchase agreements held by repo desk 102, or other databases necessary or useful in evaluating, entering into, pricing, supporting, or otherwise maintaining bank loan repurchase agreements pursuant to embodiments of the present invention.

In some embodiments, repo desk device 102 may be configured to operate as a Web server, receiving and sending information to other devices via communication device 120 through a network such as the Internet. Clients operating client devices 104 may interact with repo desk device 102 via the Internet to, for example, evaluate, price, and/or enter into bank loan repurchase transactions pursuant to embodiments of the present invention.

Those skilled in the art will appreciate that other portfolio considerations may also be taken into account when constructing bank loan portfolios. Although the present invention has been described with respect to a preferred embodiment thereof, those skilled in the art will note that various substitutions may be made to those embodiments described herein without departing from the spirit and scope of the present invention.

What is claimed is:

1. A computer processor implemented method for conducting a repurchase transaction, comprising:
    identifying, by a computer processor, at least a first bank loan held by a first party, said first bank loan having been made under a revolving line of credit, said first bank loan not being associated with a security or a mortgage;
    setting, by the computer processor, a loan margin and a re-assessable loan-market value as terms for said repurchase transaction;
    transferring, by the computer processor, said first bank loan to a second party in exchange for a first sum;
    identifying, by the computer processor, an equivalent substitute of said first bank loan; and
    generating an agreement, by the computer processor, at substantially a same time as said transferring, that said first party repurchases said first bank loan or said equivalent substitute of said first bank loan at a later date for a second sum.

2. The method of claim 1, wherein said first bank loan is a syndicated loan.

3. The method of claim 1, wherein said first bank loan has a coupon of greater than or equal to approximately Libor+1.00%.

4. The method of claim 1, wherein said transferring comprises executing an assignment of said at least first bank loan to said second party subject to retention by a borrower of economic benefits of said at least first bank loan.

5. The method of claim 4, wherein said assignment includes assignment of voting rights associated with said at least first bank loan.

6. The method of claim 1, wherein said first sum includes a repurchase loan amount plus a fee.

7. The method of claim 1, wherein said second sum is a periodic sum paid in exchange for said first sum.

8. The method of claim 1, wherein said second sum is an interest charge payable on a periodic basis in exchange for said first sum.

9. A transaction apparatus, comprising:
    a computer processor;
    a memory in communication with said computer processor and storing instructions for operating said computer processor to:
        receive information identifying at least a first bank loan held by a first party, said first bank loan having been made under a revolving line of credit, said first bank loan not being associated with a security or a mortgage;

set a loan margin and a re-assessable loan-market value as terms for said repurchase transaction;

identify an equivalent substitute of said first bank loan;

generate an agreement to transfer said first bank loan to a second party in exchange for a first sum, and at substantially a same time as said transfer, that said first party repurchases said first bank loan or said equivalent substitute of said first bank loan at a later date for a second sum.

\* \* \* \* \*